March 26, 1968  A. N. LEHBERGER  3,374,695
SPINDLE ADVANCE CONTROL FOR A DRILL PRESS
Filed Jan. 18, 1966  4 Sheets-Sheet 1

INVENTOR
Arthur N. Lehberger
BY Polachek & Saulsbury
ATTORNEYS

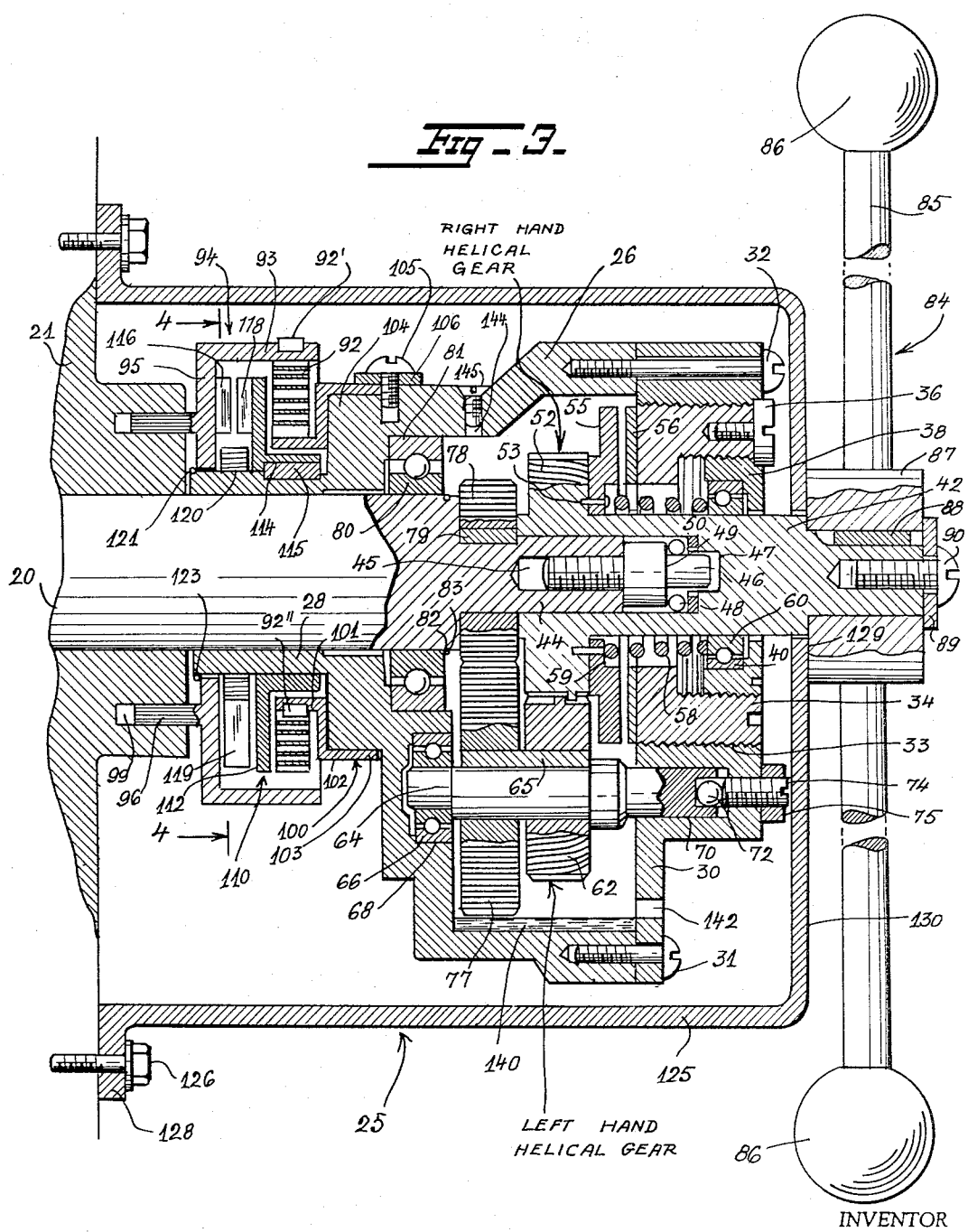

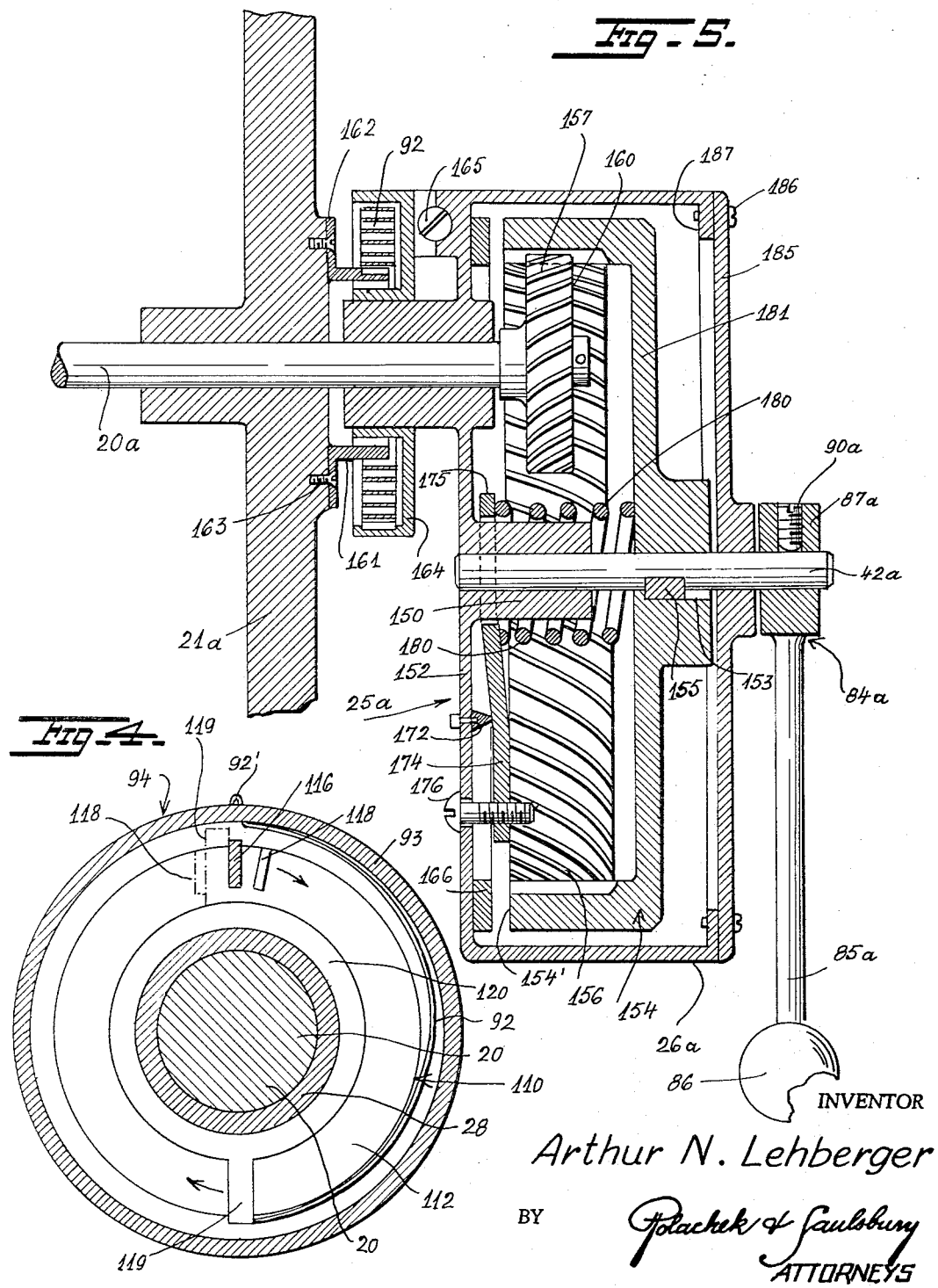

March 26, 1968  A. N. LEHBERGER  3,374,695
SPINDLE ADVANCE CONTROL FOR A DRILL PRESS
Filed Jan. 18, 1966  4 Sheets-Sheet 4
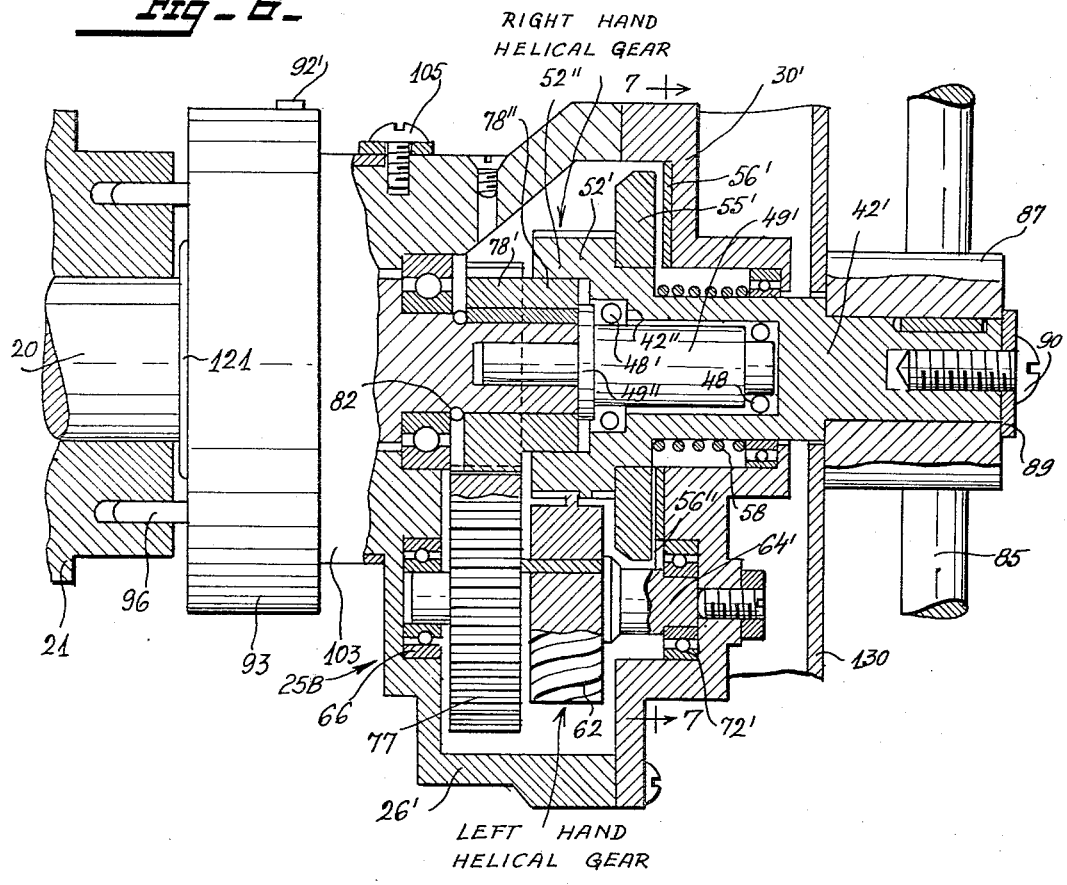
Fig-6-
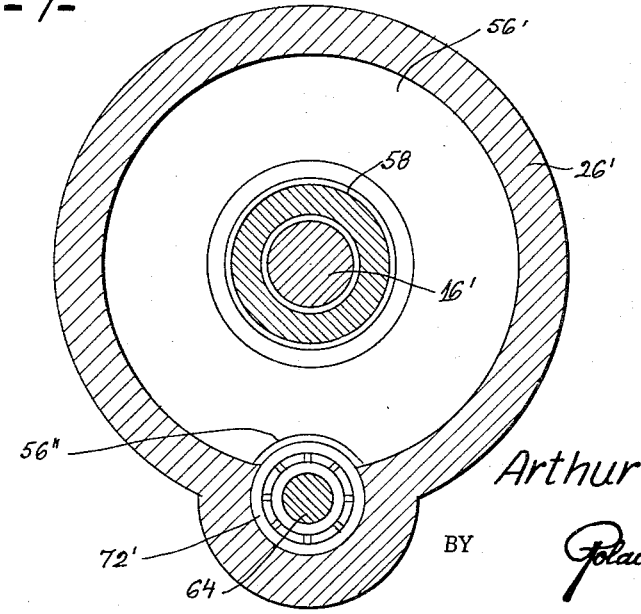
Fig-7-
INVENTOR
Arthur N. Lehberger
BY Polachek & Saulsbury
ATTORNEYS 3,374,695
SPINDLE ADVANCE CONTROL FOR
A DRILL PRESS
Arthur N. Lehberger, 256 Winfield Terrace,
Union, N.J. 07083
Filed Jan. 18, 1966, Ser. No. 521,262
9 Claims. (Cl. 77—32.8)

ABSTRACT OF THE DISCLOSURE

A spindle advance control for a drill press comprising an attachment for the drill press adapted to effect closing of the free nonworking distance between the drill bit and work to be drilled by only a fraction of a turn of the operating handle of the drill press. The operating handle of the drill press is connected to the spindle advance shaft via a gearing mechanism which has an output to input gear speed ratio greater than 1 while the spindle is advancing freely and which has a speed ratio of 1-to-1 when the drill bit encounters the work or when the spindle has fully advanced through its free distance.

---

This invention concerns a spindle advance control for a drill press.

In conventional drill presses, a rotatable handle is generally provided for advancing a motor driven spindle to the work to be drilled. The handle is mounted on a shaft operatively connected to the spindle via a rack and gear arrangement. In such drill presses, it is often necessary to turn the handle through one or two turns until the spindle carrying a chuck and drill bit reaches the work to be drilled. This turning of the operating handle while the spindle advances through a nonworking path constitutes lost motion by the drill press and operator. Where a number of pieces of work are to be drilled, the loss in time and labor by non-productive movements of the operator becomes substantial and very objectionable. Where precision drilling of multiple holes is to be performed, the required repeated idle turning of the drill press handle is very inconvenient and undesirable. The present invention is directed at solving this long standing, troublesome and objectionable situation.

According to the invention, there is provided an attachment which can be mounted on the spindle advance shaft in place of the operating handle usually installed. The attachment has its own handle which is rotated in the same manner as the replaced drill press handle. The handle is connected to the spindle advance shaft via a gear train. Turning the handle through a small angle causes the spindle advance shaft to turn rapidly since the gear train has an output to input gear ratio greater than 1. The spindle thus moves fast through the nonworking distance up to the work to be drilled. As soon as the drill bit encounters the work, the gear train is locked, so that the operating handle and spindle advance shaft are connected in a 1-to-1 gear speed ratio. The attachment is arranged so that the high gear speed ratio is effective while the spindle is advancing freely and the 1-to-1 gear speed ratio takes effect automatically when the work is encountered by the drill bit. By the arrangement described, less than half a turn of the operating handle is required to move the spindle through its maximum free distance. Thereafter the operator has full control of the drilling operation by maintaining pressure on the operating handle. If the operator released pressure on the handle during a drilling operation to retract the drill bits, the attachment automatically returns to the high gear speed ratio. Then on reapplying pressure to the handle, the 1-to-1 gear ratio is restored so drilling can continue under precise control of the operator.

It is therefore a principle object of the invention to provide an attachment for a drill press to effect closing of the free nonworking distance between drill bit and work to be drilled, by only a fraction of a turn of the operating handle of the drill press.

Another object is to provide a drill press attachment in which the operating handle of the drill press is connected to the spindle advance shaft via a gearing mechanism which has an output to input gear speed ratio greater than 1 while the spindle is advancing freely and which has a speed ratio of 1-to-1 when the drill bit encounters the work or when the spindle has fully advanced through its free distance.

A further object is to provide a drill press attachment as described, wherein the attachment has means for automatically returning the operating handle to a predetermined starting position when manual pressure on the handle is released.

Another object is to provide a drill press attachment as described which can be mounted on any conventional drill press or other power tool having a rotatable spindle advanced by rotation of a spindle advance shaft.

A further object is to provide a drill press attachment as described which is rugged in construction, simple to install, foolproof, and reliable in operation.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 3 is a further enlarged vertical sectional view taken on line 3—3 of FIG. 2.

FIG. 4 is a fragmentary sectional view taken on line 4—4 of FIG. 3.

FIG. 5 is a sectional view similar to FIG. 3, illustrating another form of the invention.

FIG. 6 is a sectional view similar to FIG. 3 illustrating a further form of the invention, and FIG. 7 is a cross sectional view taken on line 7—7 of FIG. 6.

Figure 1:
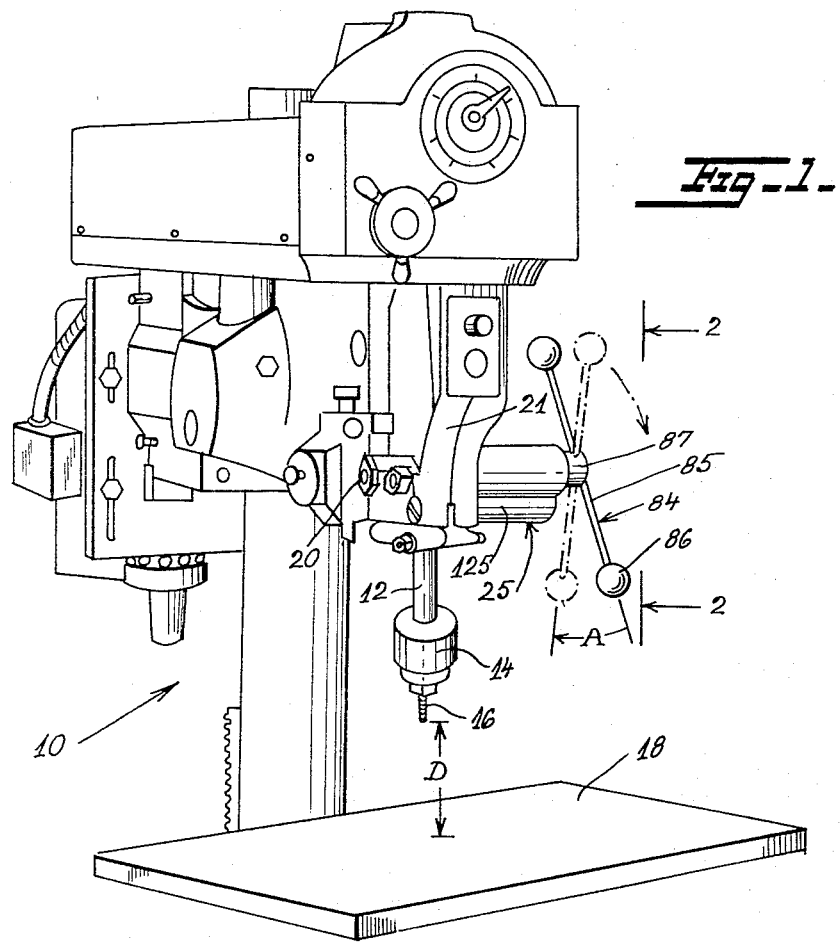
FIG. 1 is a perspective view of a drill press provided with an attachment embodying the invention.

Referring first to FIG. 1, there is shown a drill press 10 having an axially vertical rotatable spindle 12 carrying a chuck 14 in which is engaged a drill bit 16. The spindle, chuck and drill bit are all spaced vertically from work table 18 on which a piece of work to be drilled will be mounted. The drill press has an axially horizontal spindle advance shaft 20 mounted in the body 21 of the drill press. The shaft 20 is operatively connected via a rack and gear (not shown) to the spindle for advancing the spindle, chuck and drill bit axially downward through distance D to the table 18, when the shaft 20 is turned. To the extent described, the drill press is conventional. Now according to the invention, attachment 25 is mounted on the drill press and connected to shaft 20 in a manner best shown in FIGS. 2–4 to which reference is now made.

Attachment 25 comprises a massive casing 26 open at opposite ends. At one end the left end as shown in FIG. 3, the casing has a hub 28 rotatably mounted on and surrounding the spindle advance shaft 20. Shaft 20 extends in conventional manner horizontally through the body 21 of the drill press. At the right open end of the casing 26 is a closure plate 30 secured by bolts 31 and 32 engaged in threaded bores in the end of the casing. Plate 30 has a threaded bore 33 in which is seated an externally threaded ring 34 held in place by a lock screw 36. The ring 34 is internally threaded and engages an externally threaded cup ring 38 in place in ring 34 and also holds ring 34 in place in plate 30.

A short shaft 42 is rotatably mounted on short spindle 44 at the right end of shaft 20. Spindle 44 has a threaded axial bore 45 in which is a threaded extension rod 46 extending into axial bore 47 of shaft 42. Ball bearings 48 are provided between shoulder 49 formed on rod 46 and adjacent spacer 50 in bore 47 so that the handle shaft 42 can rotate freely with respect to shaft 20.

A right hand helical gear 52 is integrally formed with shaft 42 or is secured thereto and extends radially outward therefrom. Attached by pins 53 to the right vertical face of gear 52 as shown in FIG. 3 is an annular friction brake plate 55. The free right face of this plate faces a friction disk or facing 56 secured to the annular left face of ring 34. A coil spring 58, axially mounted on shaft 42 extends between the right end of recess 59 in plate 55 and bearing ring 60 of bearing race 40 in ring 38. Spring 58 biases the shaft 42, gear 52 and plate 55 to the left so that plate 55 is slightly spaced away from disk 56.

Gear 52 is meshed with a diametrally smaller left hand helical gear 62. This gear is engaged on axially horizontal gear shaft 64 by a key 65. Shaft 64 is supported at its left end by thrust ball bearing race 66 seated in a recess 68 formed in casing 26. The right end of shaft 64 is rotatably seated in a bore 70 formed in plate 30. A ball 72 engages in a recess formed in the right end of shaft 64 for adjusting axial play in the shaft. A screw 74 bearing on ball 72 and lock nut 75 complete the adjustment means for shaft 64.

A spur gear 77 which is diametrally larger than helical gear 62 is also mounted on shaft 64 and is held in place along with gear 62 by the key 65. Gear 77 is meshed with a smaller spur gear 78 which is mounted nonrotatably by key 79 on spindle 44 so that gear 78 rotates with shaft 20. A ball bearing race 80 seated in a recess 81 in casing 26 surrounds the shaft 20 so that the casing and shaft are rotatable freely with respect to each other except when friction plate 55 engages friction disk 56. A snap ring 82 in a groove 83 on shaft 20a prevents axial movement to the right of bearing race 80 and casing 26.

A handle assembly 84 is mounted on the right end of shaft 42 which extends outwardly beyond plate 30. This handle has two radially extending arms 85 on which are ball ends 86 which can be conveniently grasped manually. The handle assembly includes a hub 87 held nonrotatably on shaft 42 by a key 88 and secured in place by a washer 89 and screw 90. Thus the handle assembly and shaft 42 rotate together as a unit.

The attachment 25 is provided with a spiral spring 92 which serves as a return motivating device for the handle assembly. Spring 92 is engaged at its outer end 92' on cylindrical wall 93 of an axially horizontal cup plate 94. This plate has a circular, vertical end wall 95 provided with a pair of axially extending diametrically opposed pins 96 which fit into holes 99 formed in the adjacent wall of the drill press body 21 so that the plate 94 is nonrotatable.

The inner end 92" of spring 92 is engaged on a ring plate 100 which serves for adjusting the tension of spring 92. Plate 100 has a cylindrical flange 101 at its left end on which spring end 92" is engaged. The plate has an annular flat portion 102 abutted to an end wall portion of casing 26, and has a cylindrical end portion 103 engaged on a cylindrical portion 104 of casing 26. A lock screw 105 seated in portion 104 of the casing and washer 106 hold plate 100 in a selected fixed position on the casing.

Located inside of plate 94 is a plate 110 having an annular plate portion 112 slightly spaced from spring 92 and parallel to the annular end wall 95 of plate 94. Plate 110 has a cylindrical portion 114 engaged by a key 115 on hub 28 of casing 26. A pair of slightly spaced radially extending stop elements or lugs 116, 118 are formed integrally with plate portions 95 and 112 respectively; see FIGS. 3 and 4. Located between plate portions 95 and 112 is a freely rotatable ring 120 having a radially extending arm 119 which can be engaged by both stop elements 116 and 118 so as to stop rotation of casing 26. A split snap ring 121 engages in a groove 123 on hub 28 to keep plates 94, 110 and ring 120 in place with respect to casing 26.

An outer cylindrical cover 125 can be mounted on the drill press body 21 to surround the parts of the attachment described. Bolts 126 engaged with flange 128 of the cover hold the cover to the drill press body. Shaft 42 extends through an opening 129 in the right closed end wall 130 of the cover.

The attachment can be provided with a wall of lubricating oil 140 shown at the bottom of the axially horizontal casing 26 in FIG. 3. An oil overflow hole 142 is provided in plate 30. The oil will be picked up by gear 77 and distributed to the other gears during operation of the mechanism. An oil fill hole 144 closed by a screw 145 is provided at the upper side of casing 26.

Figure 2:
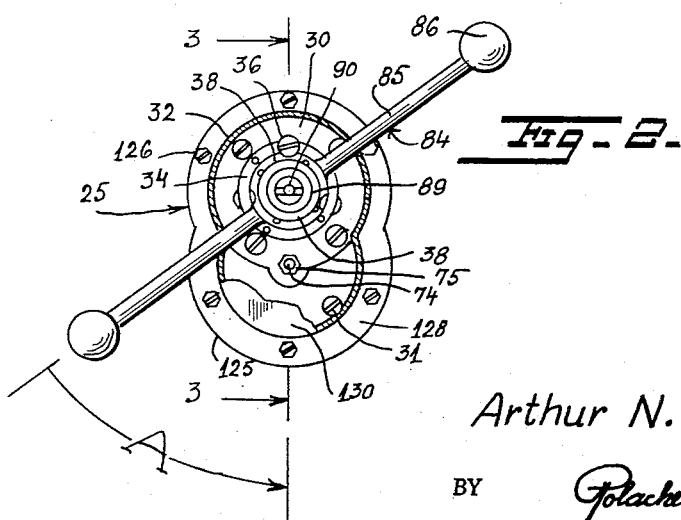
FIG. 2 is an enlarged end elevational view of the attachment taken on line 2—2 of FIG. 1, with part of a cover broken away.

In operation of the attachment 25, the operator will manually turn the handle assembly 84 through a small angle A indicated in FIGS. 2 of less than 180° i.e. less than one half turn. This will rotate shaft 42 and gear 52 through the same angle. Gear 52 rotates gear 62, and gear 77 will rotate gear 78. Gear 77 will rotate gear 78 attached to shaft 20. The gear train is so arranged that one half turn of shaft 42 results in about two turns of shaft 20 which is sufficient to advance spindle 12 through its free distance above the drill press table 18. While the spindle is descending and shaft 20 is rotating, helical gears 52 and 62 slip axially with respect to each other. When the spindle approaches the end of its permissible length of travel, the friction plate 55 carried by gear 52 reaches friction disk 56. If no working resistance is encountered by the drill bit, the plate 55 will slip frictionally around the friction disk. However, if a work piece is encountered and working pressure is further applied to the handle assembly 84, plate 55 will lock with the disk 56 and the gears will no longer rotate with respect to each other. Instead, the entire casing 26 will rotate. The casing is capable of one turn plus 340°. This is effected first by engagement of stop element 118 with arm 119 of ring 120 and then by engagement of arm 119 with stop element 116. This latter action is illustrated in dotted lines in FIG. 4.

While the casing 26 is being rotated, tension in coil spring 92 increases. Casing 26, shaft 20, shaft 42 and the handle assembly all now rotate together as a unit. The gear train is locked, so that its output-input ratio is in effect unity, or 1-to-1. The coil spring 58 is compressed while working pressure is applied to the handle assembly. If this pressure is released, the spring 58 will move the assembly of plate 55, gear 52, shaft 42 and the handle assembly to the left as viewed in FIG. 3 so that the gears are able to turn with respect to each other, and the greater than unity gear speed ratio is restored. Reapplication of the working pressure to the handle 85 results in reengagement of plate 55 with disk 56 to lock the gear train and restore unity gear ratio or direct drive between the handle assembly and the shaft 20, Complete release of the handle assembly will result in release of tension in spring 92 to restore casing 26 to its predetermined angular position with respect to shaft 20. The shaft 20 has its own starting position determined by spring return means of the usual conventional type (not shown) in the drill press. The handle assembly 84 will return to a predetermined starting position through the reverse drive action of shaft 20 through gears 78, 77, 62 and 52 in turn. The handle assembly 84 and casing 26 are thus restored to proper starting position shown in FIG. 3.

By the arrangement described, the spindle 12 advances rapidly through its free distance while the handle assembly turns through a small distance and then the mechanism is ready for application of work pressure. Initial release of working pressure on the handles initially results in positive retraction of the spindle under direct control of handle movement due to the locked condition of the gear train. Further release of working pressure on the handles results in reactivation of the gears and fast withdrawal or retraction of the spindle.

At this point it may be well to summarize some of the important features of the attachment 25 described above:

(1) The attachment employs a rotatable casing enclosing the gears.

(2) The main helical drive gear is supported on and rotates on the spindle advance shaft.

(3) A spur gear for driving the spindle advance shaft is attached thereto.

(4) The operation handle of the attachment directly turns the main helical drive gear, and causes it to slide axially.

(5) The main helical drive gear slides axially to engage the friction plate and friction disk.

(6) Screws 36, 74, 105 externally accessible permit proper adjustment of spring 92 and positions of parts 34 and 64.

(7) The attachment can be quickly removed and disassembled by removing screws accessible externally of the casing.

(8) The interior of the mechanism is free from mounting screws so that there is no danger of any such screws coming loose inside the casing.

(9) The gears remain always in mesh with each other to provide smooth and instantaneous shift or change in gear speed ratio.

(10) A ball and screw assembly provides adjustment of end play in the counter shaft.

(11) The gear train is arranged to have an output to input speed ratio greater than one when the gears turn each other.

(12) The coil spring 58 serves triple functions:

A. It holds the bearing 40 in place.

B. It assists pins 53 in keeping friction plate 55 in place on gear 52.

C. It maintains the necessary space between the friction plate and friction disk.

(13) The mutually sliding helical gears 52, 62 cooperate like a self actuating clutch to lock the casing to the shaft 20 under pressure applied by the operating handle assembly.

(14) Snap ring 121 keeps the return spring 92, casing on the spindle advance shaft and the snap rings 82 and 121 keep the parts in proper positions on the spindle advance shaft and on the casing hub.

(15) Threaded extension rod 46 serves to adjust the spacing between friction plate 55 and friction disk 56.

(16) The ready adaptability of the attachment for mounting on any drill press at the time of manufacture as original equipment or as a subsequent installation, without requiring redesign of the drill press.

FIG. 5 illustrates a modification of the invention in which a simplified attachment 25A for a drill press is provided. Parts corresponding to those of attachment 25 are identically numbered. The attachment has an operating handle assembly 84a provided with a handle 85a integral with hub 87a. The hub 87a is secured by screw 90a to shaft 42a. The axially horizontal shaft is rotatably journalled in a boss 150 extending inwardly of a casing 26a having a left end wall 152 integral with boss 150. A cup shaped internal helical gear 154 is axially slidable on and keyed to shaft 42a by key 155 in keyway 153. The teeth 156 of gear 154 are pitched oppositely from teeth 157 of a small helical gear 160 located inside of gear 154. The two gears are meshed with each other. Gear 160 is secured on the right end of the spindle advance shaft 20a of a drill press. The shaft 20a is journalled to rotate in the body wall 21a of the drill press.

Spiral spring 92 has its inner end engaged on a ring plate 161 having a flange 162 secured by screws 163 to the right side of body wall 21a. The outer end of the spring is engaged in a cup plate 164 adjustably secured by a screw 165 to casing wall 152. A circular friction ring or disk 166 is mounted at the inner side of casing wall 152. A stud 172 inserted in the casing wall 152 bears inwardly against arm 174 of a leaf spring 175 engaged on boss 150. Screw 176 seated in casing wall 152 engages arm 174. A coil spring 180 on boss 150 bears on ring portion of spring 175. Screw 176 serves as a tension adjustment for spring 180. Spring 180 bears at its right end against the right end wall 181 of gear 154. A flat end wall plate 185 can be secured by screws 186 to flange 187 on the right end of casing 26a, to support shaft 42a.

In operation of attachment 25A, the operator grasps ball 86 of handle 85a and turns it through a predetermined small angle less than one half turn. This rotates the large helical gear 154 which in turn rotates the smaller gear 160 secured on shaft 20a. The shaft 20a thus turns through a greater angle than handle 85a, shaft 42a and gear 154. When the drill press spindle encounters reverse working pressure gear 154 slips axially to the left as viewed in FIG. 5 until the flat annular rim 154' of the gear contacts friction disk 166. This locks the gear 154 nonrotatably to casing 26a so that the casing, shaft 20a, shaft 42a and handle 85a all turn together as a unit. Gear 160 is then fixed with respect to gear 154. As casing 26a is turned, the tension in spring 92 increases.

If pressure applied to handle 85a is released, contracted spring 180 will expand and relative rotation of gears 154, 160 will be restored. Complete release of handle 85a permits tensioned spring 92 to restore the casing 26a to starting position shown in FIG. 5.

While the attachment 25A does not have all the features as pointed out above for attachment 25, attachment 25A does have the advantages of relative simplicity and lower cost so that for installations where less critical control is desired or required, attachment 25A will prove very satisfactory.

FIGS. 6 and 7 illustrate a modification of the invention in which attachment 25B is generally similar to attachment 25 and corresponding parts are identically numbered and perform the functions already described. In attachment 25B is a simplified end closure plate 30' attached to the right open end of casing 26'. Friction plate 55' is secured on shaft 42' as a permanently mounted member. The right hand helical gear 52' is provided with a recess 52" in which fits an axial extension or hub 78" of upper spur gear 78'. This hub provides a bearing surface when the helical gear 52' is under heavy strain and provides sturdy rotational support.

Shaft 64' is provided with another ball bearing race 72' to cooperate with ball bearing race 66. An annular flange 49" is provided on extension shaft or rod 49' to hold spur gear 78' on shaft 30. Additional ball bearings 48' are provided between flange 49" and recess 42" in shaft 42', to cooperate with ball bearings 48. A cutout 56" is provided in friction member 56' to provide space for bearing race 72'.

The attachment 25B operates in the same manner as described for attachment 25, except that the structure is somewhat simplified and improved to bear heavier loading as described above. All attachments described fulfill a long felt need in the power field, in providing means for minimizing lost operator time and operating effort while working tool parts travel unproductively and idly to the work.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. An attachment for a power tool having a stationary body supporting a first shaft for moving a spindle a predetermined distance to a working position, said attachment comprising a casing rotatably mounted on said shaft, a first gear in said casing secured to said shaft and rotatable therewith, a second gear in the casing, means operatively engaging the first and second gears, said second gear being larger in diameter than the first gear, a second shaft extending axially of the casing, said second gear being operatively connected with the second shaft to rotate therewith, an operating handle connected to the second shaft for manually turning the same, whereby manual turning of the handle through an angle less than one turn effects turning of the first gear and first shaft through more than one turn to effect rapid advance of said spindle, and mutually engageable friction clutch means carried by the casing for engaging the friction clutch means when said handle has turned through a predetermined angle, so that the gears are rendered nonrotatable with respect to each other and to the handle and so that the first shaft rotates angularly with the handle to the same angular extent, while the casing rotates on and with the first shaft.

2. An attachment as recited in claim 1, further comprising a coil spring on the second shaft bearing against said second gear and tending to separate said friction clutch means when operating pressure on the handle is released.

3. An attachment as recited in claim 2, further comprising a spiral spring in the casing disposable concentric with the first shaft, means for coupling one end of the spiral spring to said stationary body, and means for coupling the other end of the spiral spring to said casing, whereby said spiral spring is tensioned when the casing rotates and whereby the casing is restored to an initial angular position with respect to the first shaft when pressure on the operating handle is released.

4. An attachment as recited in claim 1, wherein the means operatively engaging the first and second gear comprises third and fourth gears, said first and third gears being spur gears meshed with each other, said second and fourth gears being helical gears having teeth pitched in opposite directions.

5. An attachment as recited in claim 4, further comprising a first friction clutch member carried by the helical second gear, a second friction clutch member carried by the casing and engageable with the first friction clutch member, said second gear being movable axially on the first shaft for engaging and disengaging the friction clutch members when the handle is turned through a predetermined angle, and whereby all the gears are locked and nonrotatable with respect to each other when the handle is turned to engage the friction clutch members, so that the first shaft rotates angularly with said handle in effective unity gear speed ratio while the casing rotates on and with the first shaft and revolves with the locked gears.

6. An attachment as recited in claim 5, further comprising a coil spring on the second shaft bearing between said casing and second gear and tending to separate the friction clutch members when operating pressure on the handle is released.

7. An attachment as recited in claim 6, further comprising a spiral spring in the casing concentric with said casing and first shaft, a first plate engageable nonrotably with said stationary body of the power tool, means coupling one end of the spiral spring to the first plate, a second plate held to the casing, and means coupling the other end of the spiral spring to the second plate whereby said spiral spring is tensioned when the casing rotates, from an initial position with respect to said first plate, and whereby the spiral spring restores said casing to said initial position when pressure on the handle is released.

8. An attachment as recited in claim 7, further comprising a third plate secured to and rotatable with the casing, stop elements carried by the first and third plates, and a ring rotatably carried by the casing and disposed between the first and third plates, said ring having a radial arm engageable between the said stop elements to limit angular rotation of the casing.

9. An attachment as recited in claim 7, further comprising a first snap ring on said casing for holding the first plate and ring on the casing, second snap ring mountable on the first shaft for holding the casing thereon, a fourth plate closing one end of the casing, said fourth plate having a threaded bore, a threaded ring in said bore, a first lock screw adjustably locking said third plate to the casing for adjustably tensioning said spiral spring, a second lock screw for locking said threaded ring in the fourth plate, said threaded ring supporting said second friction clutch member, a common gear shaft in the casing carrying both the third and fourth gears, and adjustment lock screw means carried by the fourth place for adjusting end play in said common gear shaft and adjusting spacing between the friction clutch members.

References Cited

UNITED STATES PATENTS 2,995,960  8/1961  Riley _____ 77—34.6 XR

FRANCIS S. HUSAR, *Primary Examiner.*